(12) United States Patent
Yang et al.

(10) Patent No.: US 11,656,974 B2
(45) Date of Patent: May 23, 2023

(54) ENHANCED PERFORMANCE DIAGNOSIS IN A NETWORK COMPUTING ENVIRONMENT

(71) Applicant: International Business Machines Corporation, Armonk, NY (US)

(72) Inventors: Jie Yang, Beijing (CN); Yao Zhao, Beijing (CN); Fei Tan, Beijing (CN); Xin Yu Pan, Beijing (CN); Ling Qin, Beijing (CN); Pin Yi Liu, Beijing (CN); Wei Wu, Beijing (CN); Jiang Yi Liu, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 176 days.

(21) Appl. No.: 17/369,079

(22) Filed: Jul. 7, 2021

(65) Prior Publication Data

US 2023/0007857 A1    Jan. 12, 2023

(51) Int. Cl.
*G06F 11/00* (2006.01)
*G06F 11/36* (2006.01)

(52) U.S. Cl.
CPC ........ *G06F 11/3644* (2013.01); *G06F 11/366* (2013.01)

(58) Field of Classification Search
CPC .. G06F 11/0793; G06F 11/366; G06F 11/079; G06F 11/3476; G06F 11/3466; G06F 11/3636; G06F 11/3409
See application file for complete search history.

(56) References Cited

U.S. PATENT DOCUMENTS 9,438,478 B1   9/2016   Amulothu et al.
9,449,278 B2   9/2016   Davlos et al.
(Continued)

FOREIGN PATENT DOCUMENTS

CN         104657250 B      5/2015

OTHER PUBLICATIONS

Mell. "The NIST Definition of Cloud Computing"; National Institute of Standards and Technology; NIST Special Publication 800-145; Sep. 2011; 7 pages.

*Primary Examiner* — Charles Ehne
(74) *Attorney, Agent, or Firm* — Cantor Colburn LLP; Teddi Maranzano

(57) ABSTRACT

Embodiments provide enhanced performance diagnosis in a network computing environment. In response to an occurrence of a performance issue for a node while under operating conditions, common logs for applications on the node are analyzed. The applications are respectively registered in advance for diagnosis services. The applications each register rules in advance for the diagnosis services. At a time of the performance issue, debug programs are automatically issued to generate debug level logs respectively for the applications. Debug level logs are analyzed according to the rules to determine a root cause of the performance issue. A potential solution to the root cause of the performance issue is determined using the rules, without having to recreate the operating conditions occurring during the performance issue. The potential solution to rectify the root cause of the performance issue is executed without having to recreate the operating conditions occurring during the performance issue.

20 Claims, 14 Drawing Sheets

(56) References Cited

U.S. PATENT DOCUMENTS

| | | | |
|---|---|---|---|
| 11,269,756 B1* | 3/2022 | Hristu | G06F 11/079 |
| 2006/0029016 A1* | 2/2006 | Peles | H04L 43/106 |
| | | | 370/328 |
| 2009/0320021 A1* | 12/2009 | Pan | G06F 11/0715 |
| | | | 718/100 |
| 2015/0193328 A1 | 7/2015 | Deakin et al. | |
| 2017/0168914 A1 | 6/2017 | Altman et al. | |
| 2017/0286268 A1 | 10/2017 | Lincoln et al. | |
| 2018/0349213 A1 | 12/2018 | Antony et al. | |
| 2020/0341868 A1* | 10/2020 | Carpenter | G06F 11/0709 |

* cited by examiner

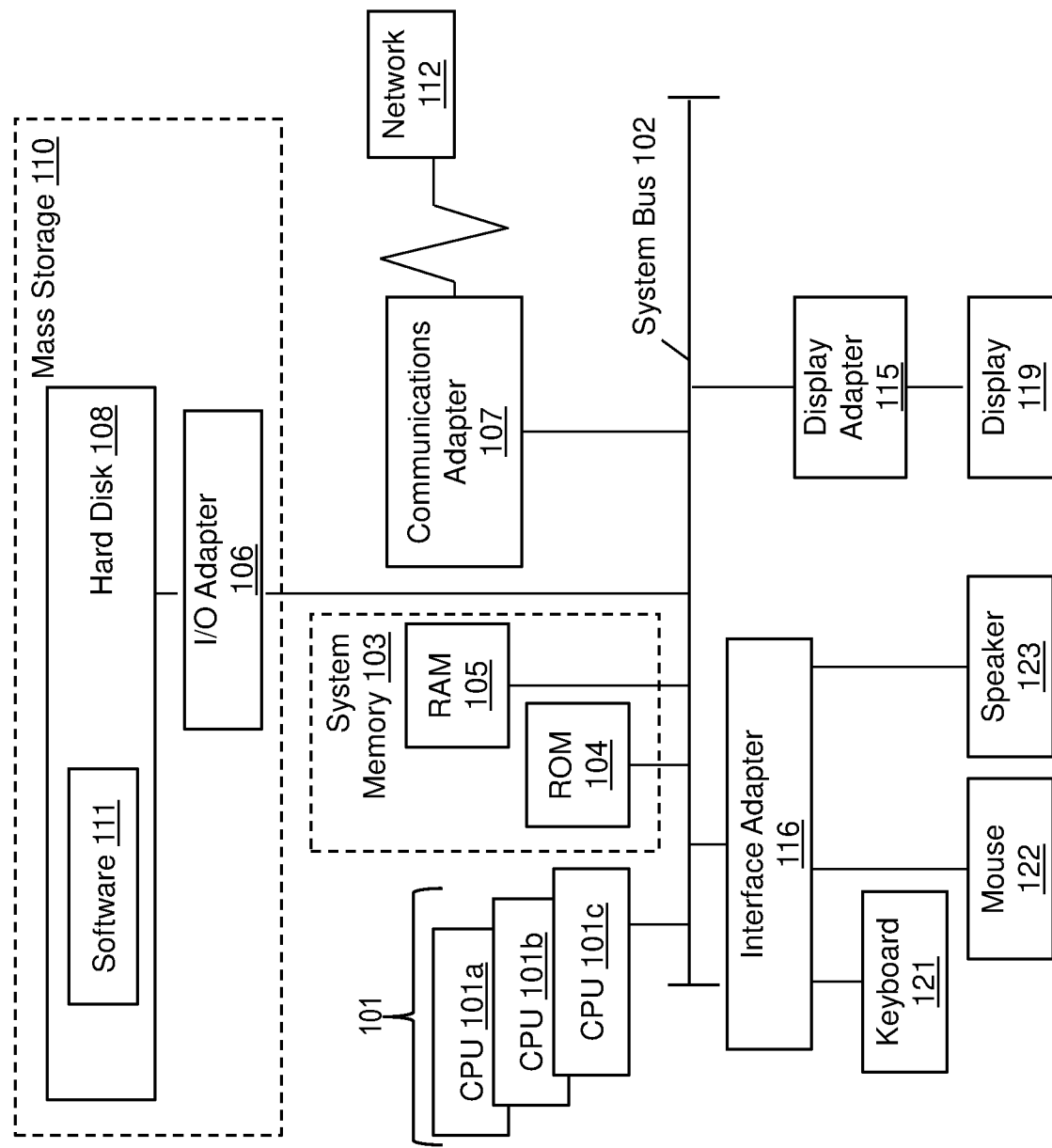

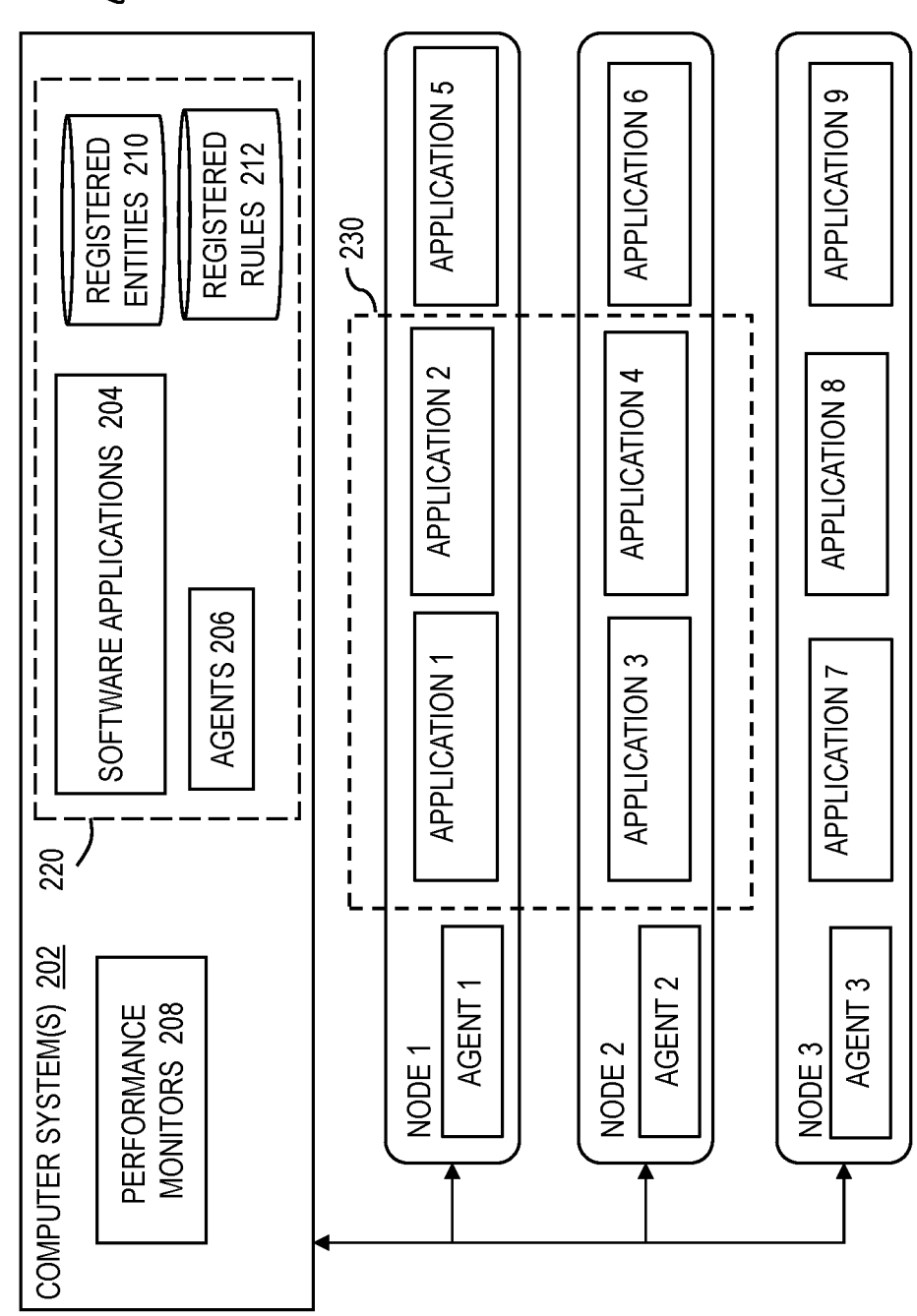

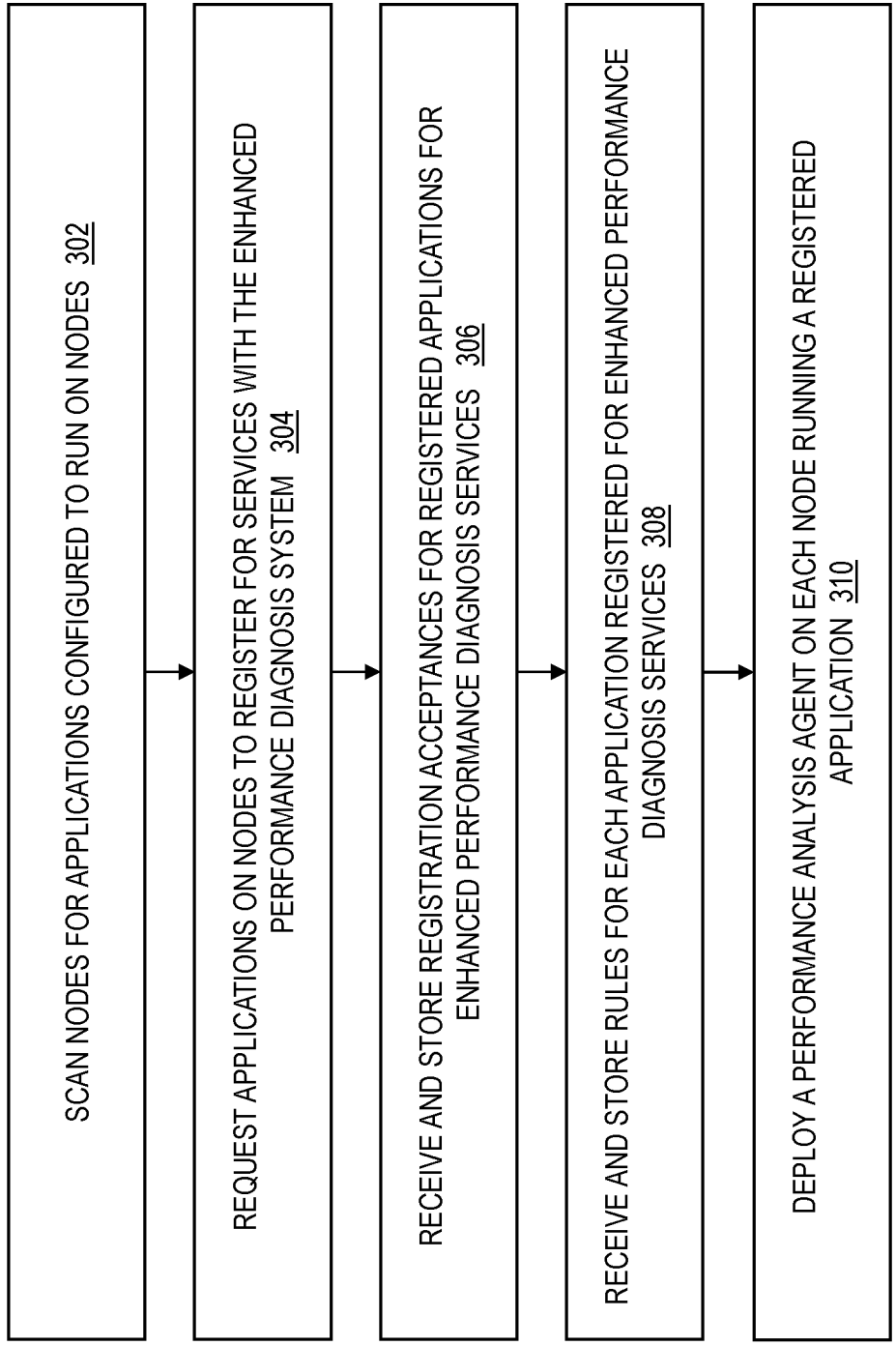

FIG. 4
TABLE 1

Example: Application 1 registered that the following statements need to be analyzed:

Basic information:
  Log files names and location
    Enable debug level log with command "debug on all"
    Take dump with command "dump all", etc.
    Who has work relationship with me: a, b, c....
    Who has dependency on me: a, c..
    Who do I depend on: b, d, ...
Problems:
  Keywords, thresholds, etc.
  Logs which need to be monitored,
  Initial debug data gathering steps,
  Initial data analysis tools,
  Initial analysis result Types:
    Type1: next debug method: data gathering steps, analysis tools, final actions,
    ...
    TypeN: next debug method: data gathering steps, analysis tools, final actions.

FIG. 5

TABLE 2

Example: Application 1 registered that following statements need to be analyzed:

Basic info: Shown in Table 1
Problems: Shown in Table 1
Statements that need to be noticed:
1.
[timestamp]: Retrieving * from [name] on [IP]:[port]
[timestamp]: Receiving * from [name] on [IP]:[port]
Threshold of timestamp difference: >900s
Action: debug [name] on [IP]:[port]
2.
[timestamp]: Start processing xyz
[timestamp]: End processing xyz
Threshold of timestamp difference: >10mins
Action:
Restart with option –D192
or
execute command "debug on xyz"

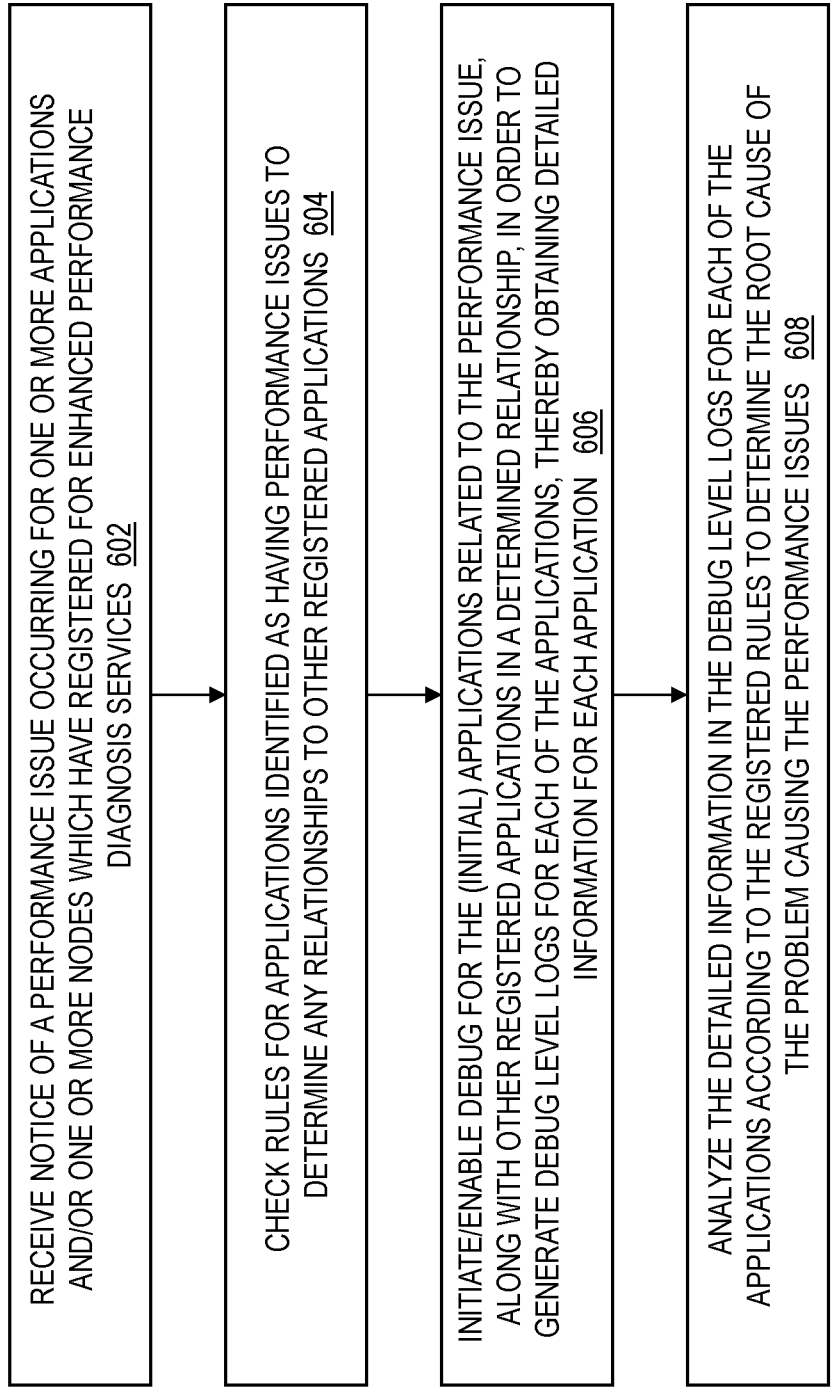

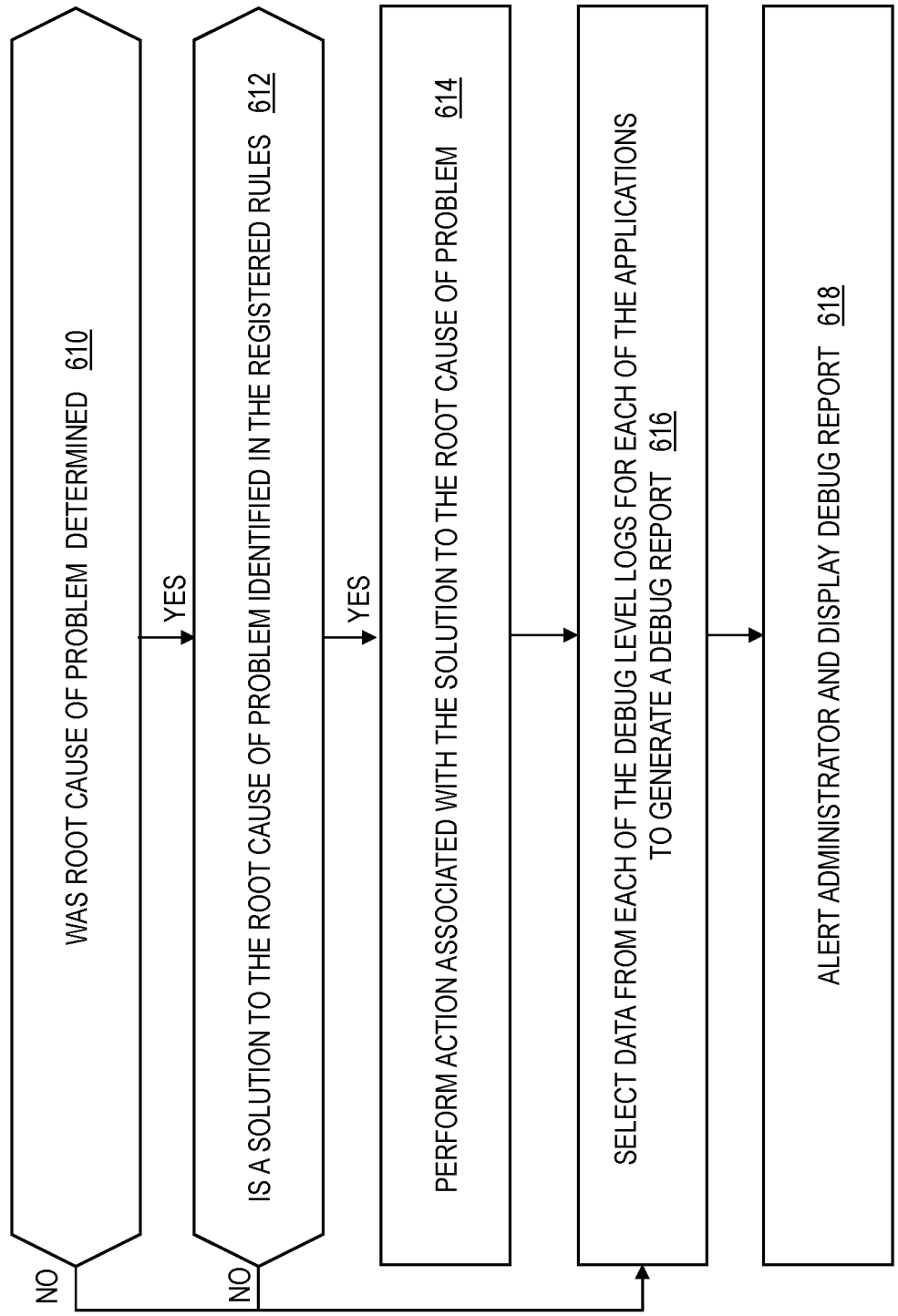

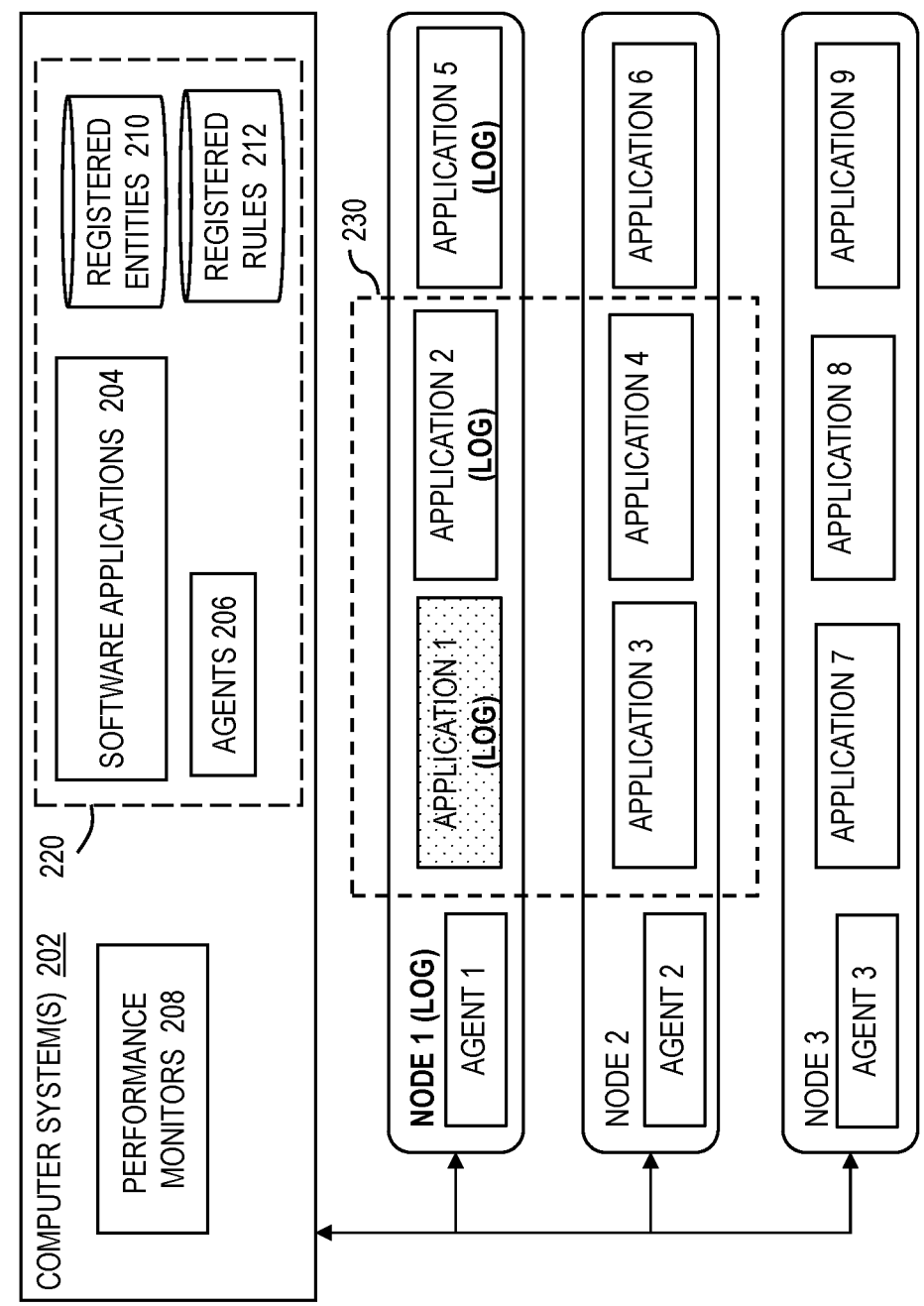

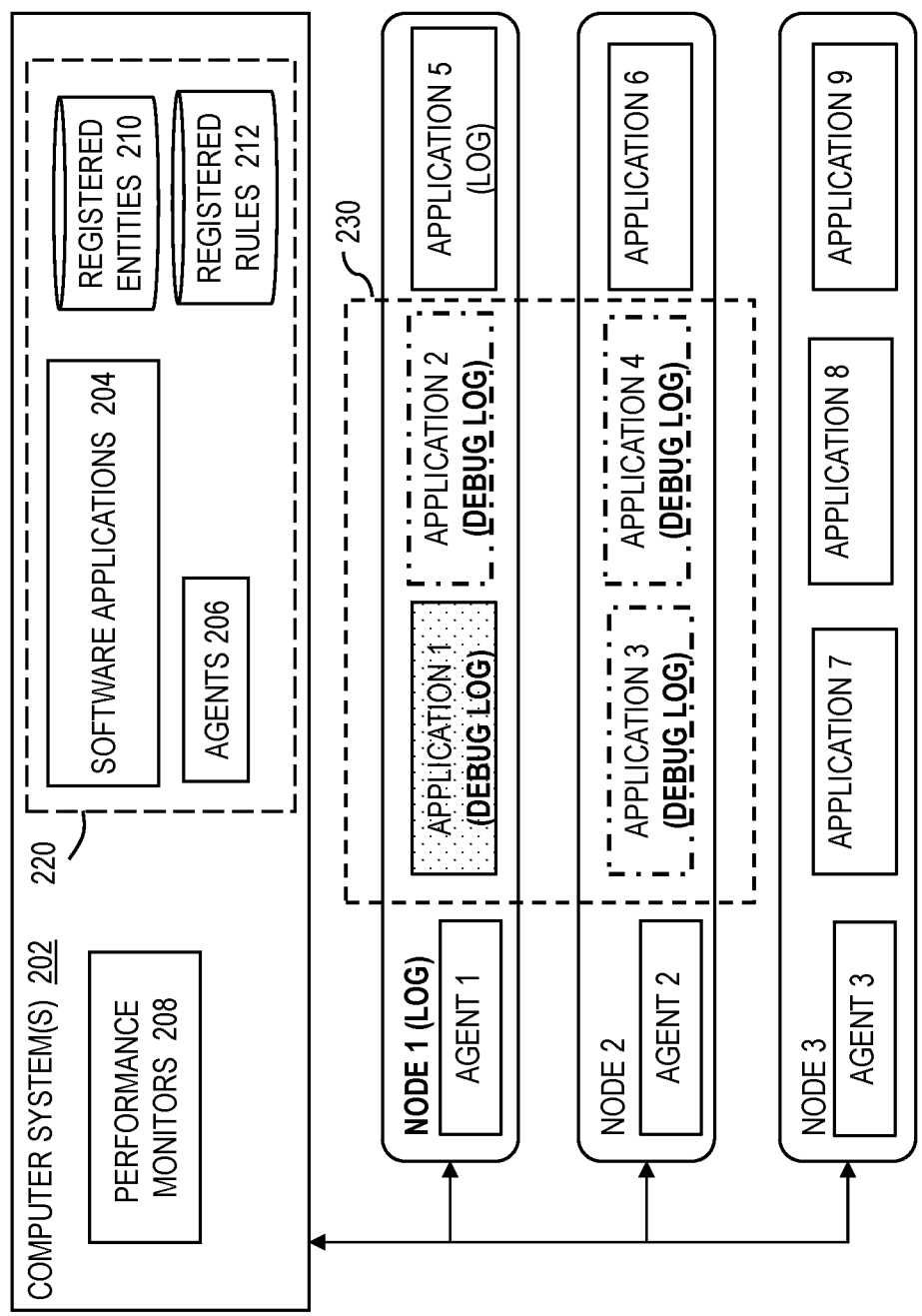

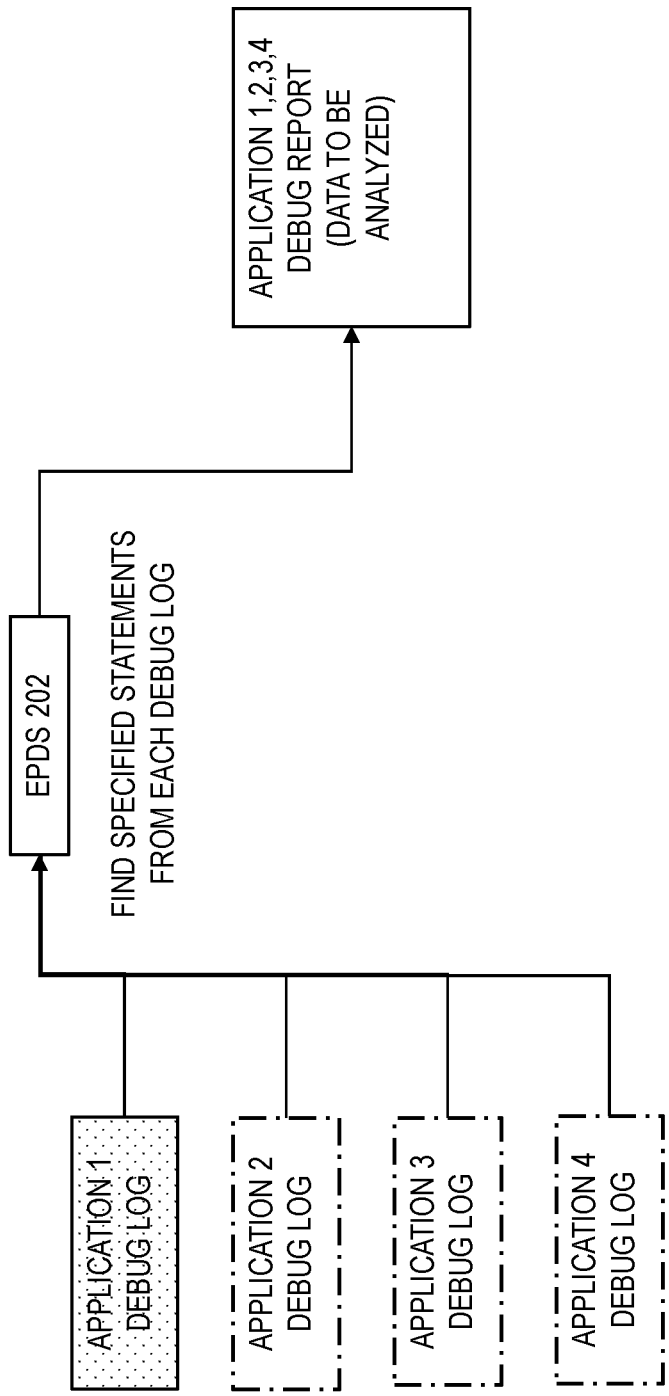

ENHANCED PERFORMANCE DIAGNOSIS IN A NETWORK COMPUTING ENVIRONMENT

BACKGROUND

The present invention generally relates to computer systems, and more specifically, to computer-implemented methods, computer systems, and computer program products configured and arranged for providing enhanced performance diagnosis in a network computing environment, such as, for example, a cloud environment.

Performance engineering in large, distributed systems is a complex endeavor. Testing systems to meet performance requirements of response time, memory consumption, and central processing unit (CPU) time requires proficient use of monitoring tools. Performance test tools are used to record logs and audit traces. Metrics such as CPU utilization are used to record event details, along with application behavior and/or system behavior during a run. A vital part of performance assessment is logging, which represents a real and substantial data overhead in this field, for example, in the range of petabytes of data. As an example, a performance test run for an enterprise-grade architecture spans several days, monitoring the performance of several hundred servers handling 500 transactions per second, involving 100,000 concurrent users. The act of producing monitoring data including logging output and metrics adds to the workload and can affect application and/or system performance. When considering that each server can feature multiple logging points and each logging point can generate terabytes of data per day, it is easy to understand why log overhead has become a critical issue.

Customarily, in the event a performance issue is found, it becomes necessary to repeat the faulty scenario, though with higher monitoring levels, to identify and track the root cause of the problem. The general procedure is to stop the workload, increase the monitoring level, and rerun the hours-long test or days-long test, hoping that the same problem will occur in the same node. This does not always occur because runs are randomized in a production environment.

SUMMARY

Embodiments of the present invention are directed to computer-implemented methods for providing enhanced performance diagnosis and resolution in a network computing environment, such as, for example, a cloud environment. A non-limiting example computer-implemented method includes, in response to an occurrence of a performance issue for a node in a computing environment while under operating conditions, analyzing common logs for applications on the node, the applications being respectively registered for diagnosis services in advance of the performance issue, the applications each registering rules for the diagnosis services in advance of the performance issue. The computer-implemented method includes automatically initiating at a time of the performance issue debug programs to generate debug level logs respectively for the applications and analyzing the debug level logs according to the rules to determine a root cause of the performance issue. The computer-implemented method includes determining a potential solution to the root cause of the performance issue using the rules, without recreating the operating conditions occurring during the performance issue. Also, the computer-implemented method includes executing the potential solution to rectify the root cause of the performance issue without recreating the operating conditions occurring during the performance issue.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 depicts a block diagram of an example computer system for use in conjunction with one or more embodiments of the present invention;

FIG. 2 is a block diagram of an example computing environment using enhanced performance diagnosis and resolution in accordance with one or more embodiments of the present invention;

FIG. 3 is a flowchart of a computer-implemented process for performing registration for nodes and applications in order to perform enhanced performance diagnosis and resolution in accordance with one or more embodiments of the present invention;

FIG. 4 depicts a table of example registration information stored in a registered rules database for an application in accordance with one or more embodiments of the present invention;

FIG. 5 depicts a table of an example of further registration information stored in a registered rules database for an application in accordance with one or more embodiments of the present invention;

FIGS. 6 and 7 depict a flowchart of a computer-implemented process for performing enhanced performance diagnosis and resolution in accordance with one or more embodiments of the present invention;

FIG. 8 depicts a block diagram illustrating an example scenario using enhanced performance diagnosis and resolution in accordance with one or more embodiments of the present invention;

FIG. 9 depicts a block diagram further illustrating the example scenario using enhanced performance diagnosis and resolution in accordance with one or more embodiments of the present invention;

FIG. 10 depicts a block diagram illustrating selecting registered data from debug level logs for respective applications to generate a debug report in accordance with one or more embodiments of the present invention;

DETAILED DESCRIPTION

Figure 11:
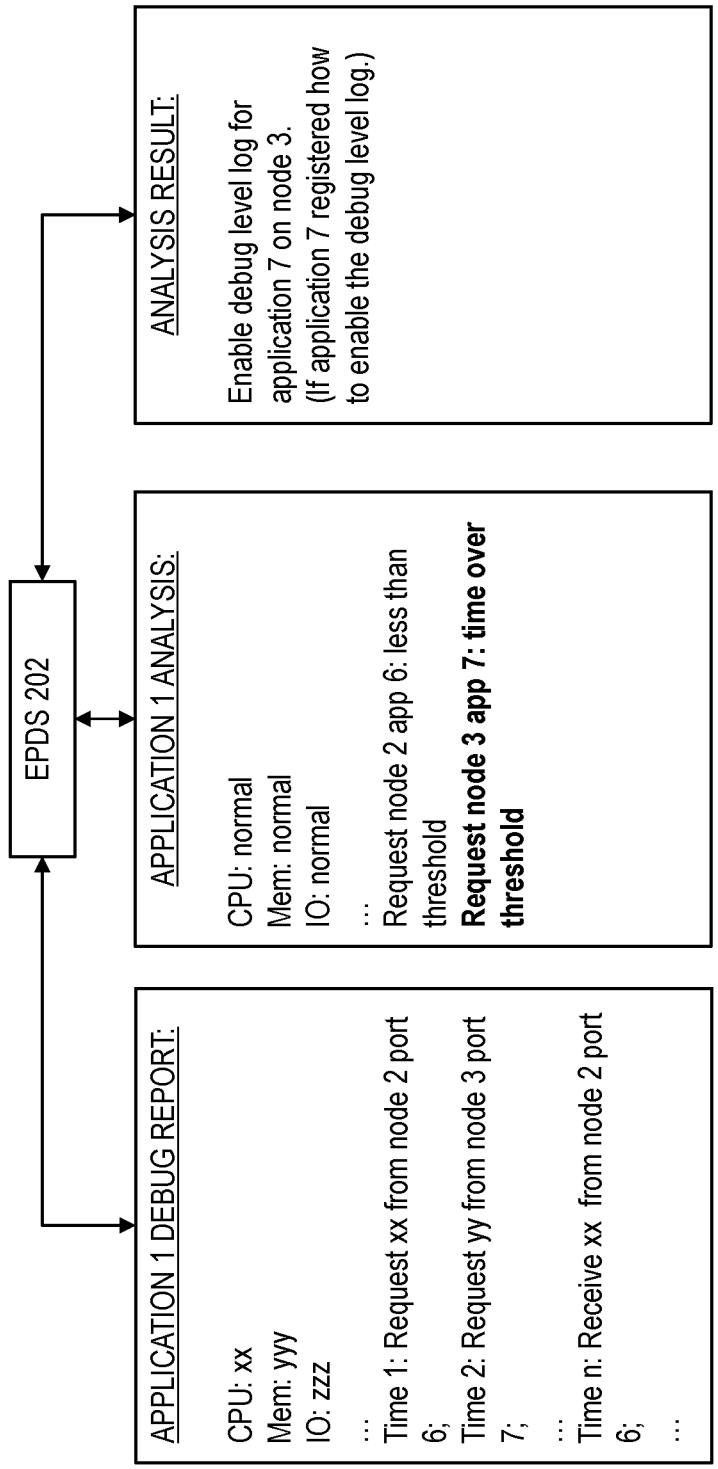
FIG. 11 depicts a block diagram illustrating details of example analysis for enhanced performance diagnosis and resolution in accordance with one or more embodiments of the present invention.

One or more embodiments of the present invention provide computer-implemented methods, computer systems, and computer program products arranged and configured for providing enhanced performance diagnosis in a network computing environment, such as, for example, a cloud environment. According to one or more embodiments of the invention, a lightweight method and system are provided to diagnose and resolve cloud environment performance issues. The system accepts registration of rules from the nodes and applications in the cloud environment. Based on the rules, the system monitors the nodes and applications. When a performance issue occurs, the system can gather lightweight data first and automatically analyze the lightweight data to narrow down to the specific node and/or application. The system initiates/enables traces for all related nodes and applications to gather first-hand tracing/debugging data as soon as the short-term performance issue occurs, where the tracing/debugging data correspond to debug level logs. Then, the system executes the registered methods in the rules, performs further analysis on the debug level logs data to find the root cause and corresponding solution, performs and/or causes the solution to the root cause of action to be performed, and saved the data. According to one or more embodiments, a customer or client using the resources of the client environment can avoid needing to reproduce the performance issue for data gathering because the system automatically initiates/starts debug level logs at the first start of the performance issue.

Cloud service performance is an important issue that customers and clients are concerned about. In related technologies, a performance monitor catches high-level performance data of the cloud environment, and each node and pod have performance monitors too. The pod includes the files needed to deploy an application on a server. If a performance issue occurs, the performance monitor will capture the response time and warn the administrator, and each node may stop (i.e., discontinue) the instance occupying too much of a resource and then restart a new one. If the administrator wishes to find the root cause of the performance issue, only regular logs which capture high-level performance data can be used. Regular logs are also referred to as common logs, normal logs, etc., which are all related to high-level data. The administrator may know which node and application has the problem, but there is no debug level log. In other words, no debug level log was initiated and recorded. Although there are methods like distributed tracing, for example, such as OpenTracing, which help to debug performance problems, distributed tracing requires that software developers add instrumentation to the code of an application or to the frameworks used in the application. Particularly, distributed tracing requires products to make code change. The debug level log is crucial for locating cloud performance root cause, but in normal computing environments the debug level log is closed because always running debug level logs would require an unfeasible amount of data and memory. An administrator would have to enable debug level logging manually and attempt to reproduce the original problem. This is slow and difficult, and customers/clients may prefer not to reproduce the problem, especially when the customer/service provides a critical service (e.g., a bank or financial service, a cyber security service, etc.) that should not be interrupted or compromised.

One or more embodiments of the invention provides a system for diagnosing and resolving performance issues in a cloud environment by gathering first-hand tracing/debugging data as soon as the short-term performance issue occurs and fixing the performance issues (contemporaneously) without the need or requirement to reproduce the original problem and without the need or requirement to modify the code of the application. Moreover, the time between detecting the performance issue and automatically initiating/enabling the debug level logs could not be performed in the human mind with the assistance of pen/paper and is faster than what could be performed in the human mind with the assistance of pen/paper. Further, performing the analysis of the debug level logs, determining root cause of the problem, and/or resolving root cause of the problem (which could be a malicious computer attack or intrusion, a computer security threat, a serious malfunction of software/hardware, etc.) could each be very time sensitive and prevent further exposure to the root cause of the problem. Additionally, the administrator is simultaneously alerted to the problem and each stage of the process is displayed to the administrator. Each stage in the process could be critical in avoiding and preventing a potential deterioration of software/hardware of a computer system in the cloud environment. Accordingly, one or more embodiments of the invention improve the functioning of a computer system itself as well as multiple computer systems interconnected in a cloud environment.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIG. 2 is a block diagram of an example computing environment 200 which includes enhanced performance diagnosis and resolution of a performance issue according to one or more embodiments of the inventions. Computing environment 200 can include computer systems 202 coupled to nodes, such as nodes 1, 2, 3. Computer systems 202 and nodes 1, 2, 3 can include any of the hardware and software components and functionality discussed in computer system 100 of FIG. 1. Computer environment 200 may be representative of one or more portions of a cloud environment. It should be appreciated that, although only three nodes are illustrated for simplicity, computing environment 200 can include numerous nodes in appropriate communication as understood by one or ordinary skill in the art. Nodes are the hardware on which applications run. Nodes 1, 2, 3 may be various servers, mainframes, etc. In one or more embodiments, computer system 202 may be representative of a single server or one or more servers. Computer system 202 includes one or more software applications 204 and agents 206 in an enhanced performance diagnosis system (EPDS) 220 configured to perform enhanced performance diagnosis and resolution by determining the root cause of the problem for the performance issue. In one or more embodiments, EPDS 220 is configured to perform/take/cause actions to resolve the root cause of the problem producing the performance issue. Computer systems 202 and nodes 1, 2, 3 can be used in and/or implemented in node 10 in FIG. 13. Functions of system 200 can use and/or be implemented in any of the components of hardware and software layer 60 depicted in FIG. 14.

Computer system 202 includes one or more performance monitors 208, which are representative of various known monitoring tools, techniques, and functionality for a cloud environment as understood by one of ordinary skill in the art. Performance monitors 208 capture overall high-level performance data of a cloud environment. Performance monitors 208 can be representative of performance monitors for each of the nodes and various applications running on the nodes. Computer system 202 includes EPDS 220 which is in communication with performance monitors 208 to receive notices and/or alerts of performance issues for enhanced performance diagnosis such that EPDS 220 can analyze the performance issue, determine the root cause of the problem, and perform (registered) actions to correct the root cause of the problem, according to one or more embodiments.

As discussed herein, EPDS 220 is configured to, when the monitoring tool finds any performance issues/problems, collect the first-hand data of all related nodes and applications, analyze the data and find out which component (e.g., application, node, and/or external server) causes the delay. EPDS 220 can automatically enable detailed tracking (i.e., tracing/debugging using debug level logs) of the component (e.g., application, node, and/or external server), retrieve a series of pre-defined actions of the component (e.g., application and node) from rules registered in advance, collect and generate detailed data for subsequent analysis to determine the root cause of the problem, and take action to resolve the root cause of the problem.

FIG. 3 is a flowchart of a computer-implemented process 300 for performing registration for nodes and applications in order to perform enhanced performance diagnosis and resolution in accordance with one or more embodiments of the present invention. In general, registration is used to obtain and register information of nodes and applications in the cloud environment, including the following: log files for the nodes and applications; the relationships of nodes and applications which include relationships among nodes, applications, and external servers outside the cloud environment; and how to enable debug level logs for each node and each application. Also, each application registers its process of analysis to determine the root cause of the problem and the solution to the root cause of the problem along with actions to execute for resolution. Computer-implemented process 300 may be performed using computer system 202 in FIG. 2.

At block 302 of the computer-implemented process 300, one or more software applications 204 are configured to scan nodes and applications, for example, nodes 1, 2, 3 and applications 1, 2, 3, 4, 5, 6, 7, 8, 9 which are part of the cloud environment. Software applications 204 can also be called by applications seeking registrations, such as when applications are deployed on their respective nodes in the cloud environment.

At block 304, software applications 204 are configured to request registration information from applications on nodes in order to register for service with the enhanced performance diagnosis system. At block 306, software applications 204 are configured to receive and store registration acceptances from registered applications in a registered entities database 210. At block 308, software applications 204 are configured to receive and store registration information for each of the registered applications in registered rules database 212. In one or more embodiments, software applications 204 may use one or more application programming interfaces (APIs) to request and obtain the registration information. At block 310, software applications 204 are configured to deploy a performance analysis agent 206 (including agents 1, 2, 3) on each node running a registered application. For example, agent 1 (of agents 206) is deployed on node 1 to monitor registered applications 1, 2, 5, agent 2 is deployed on node 2 to monitor registered applications 3, 4, 6, and agent 3 is deployed on node 3 to monitor registered applications 7, 8, 9.

When the node and/or application is started in the cloud environment, software applications 204 are configured to start the performance analysis agent of the node at the same time (or nearly the same time), and all (or some of) registration rules related to the node and/or application are distributed by software applications 204 to the agent. When the performance issue (problem) occurs, the agent is configured to collect data according to the distribution rules in registered rules database 212, submit data to software applications 204 according to the rules, and/or analyze the data and submit analysis results to software applications 204. Software applications 204 of EPDS 220 are configured to collect data and analyze the data, collect and analyze results collected by agents, generate analysis report, trigger next data collection, determine the root cause of the problem, and trigger/perform final actions as the solution to the root cause of the problem. In one or more embodiments, the agents running on respective nodes may be configured to determine the root cause of the problem and trigger/perform final actions as the solution to the root cause of the problem.

Registration can be performed in many ways, for example, using XML, JSON, receipt of manual input information, etc. The registration information is obtained and stored for each of the respective applications in registered rules database 212, and some applications can provide more or less registration information to software applications 204. In the registration information (i.e., registered data) stored in registered rules database 212 for each application, software applications 204 are configured to store the basic information such as, for example, hostname (of the node) on which the application runs, log files names of common/normal log files and debug level log files for the application, log file locations of common/normal log files and debug level log files for the application, relationship with other nodes/components/applications, etc.

In the registration information (i.e., registered data) stored in registered rules database 212 for each application, software applications 204 are configured to store problems: (potential) problem types regarding the application and solutions, keywords to search in common/normal log files and debug level log files regarding the application, thresholds regarding different problem types, logs (common/normal log files and debug level log files) that need to be monitored for the application, initial data gathering processes for the application, initial data analysis tools for the application, initial data analysis rules for the application, and initial analysis result issue types for the application. Each application can have various initial analysis results types that are identified and stored in advance of the occurrence of a performance issue. Initial analysis results types may include Type1: detailed data gathering processes, analysis tools, and analysis rules; next detailed data gathering processes, analysis tools, and analysis rules . . . ; and final actions to recover (i.e., how to perform the solution). Initial analysis results types may include Type N: detailed data gathering processes, analysis tools, and analysis rules; next detailed data gathering processes, analysis tools, and analysis rules . . . ; and final actions to recover (i.e., how to perform the solution).

As stored in registered rules database 212, each application defines its own options and commands to be utilized by software applications 204 upon the occurrence of a performance issue. FIG. 4 depicts a block diagram of example registration information stored in a Table 1 in registered rules database 212 for an application in accordance with one or more embodiments. FIG. 5 depicts a block diagram of further example registration information stored in Table 2 in registered rules database 212 for the application in accordance with one or more embodiments. FIG. 5 highlights log analysis rules. For illustration purposes, Tables 1 and 2 depict registration information for application 1 but it should be appreciated that each of the registered applications has its own registration information in registered rules database 212. Software applications 204 are configured to perform, execute, abide by, and use the registration information in Tables 1 and 2 to provide enhanced diagnosis services for application 1; also, software applications 204 are configured to instruct and control agents 206, such as agent 1 deployed on node 1 for application 1, to perform the same and/or at least part of the same.

As noted above, each application defines its own rules, including basic information, problems, and log analysis rules in registered rules database 212. Basic information includes the name and location of files to be monitored. Problems (i.e., problem data) include keywords to be monitored and acted on, thresholds, preliminary data collection processes, analysis tools, analysis rules, analysis result types, and detailed data collection steps corresponding to each type. Log analysis rules (including statements) include solutions and final recovery actions.

In the cloud environment, each component has deployment files. By parsing the deployment files for an application being deployed on a node, software applications 204 of EPDS 220 can automatically obtain the relationship information among all levels, nodes, components, and applications and can obtain log file location information for the application in order to register the application. This information can be updated automatically in registered rules database 212 when the cloud environment changes such as when new nodes are added, nodes removed, applications are added, applications are removed, etc. All registered applications provide access (permission and authorization) to their logs, which may include special protocols, passwords, etc. The registration rules in registered rules database 212 include the name and location of the logs to be monitored and the statement to be processed. The rule specifies how many times the error occurs (i.e., threshold) before data collection and analysis function of software applications 204 are started.

FIGS. 6 and 7 depict a flowchart of a computer-implemented process 600 for performing enhanced performance diagnosis and resolution in accordance with one or more embodiments of the present invention. At block 602, software applications 204 are configured to receive notice of a performance issue occurring for one or more applications and/or one or more nodes which have registered for enhanced performance diagnosis services. When a performance issue/problem occurs, software applications 204 are triggered immediately. For example, software applications 204 may be triggered within less than and/or about 0.5 millisecond (ms), 1 ms, 2 ms, 3 ms, 4 ms, 5 ms, and/or 10 ms. Software applications 204 may be triggered within less than and/or about 1 microseconds (µs), 2 µs, 3 µs, 4 µs, and/or 5 µs. Agents deployed on nodes 1, 2, 3 and/or performance monitors 208 can trigger/inform software applications 204 to initiate enhanced performance services.

EPDS 220 works together with various methods of cloud management. Problems can be found by monitoring tools of performance monitors 208 in the cloud, and/or the problem keywords can be found by (agents and/or software applications 204) monitoring logs (e.g., common/normal logs first) of the applications according to registration rules.

At block 604, software applications 204 (including agents) are configured to check rules in registered rules database 212 for applications identified as having performance issues to determine any relationships to other registered applications.

At block 606, software applications 204 (including agents) are configured to start and enable debug programs for the initial application related to the performance issue, along with other registered applications determined to be in relationship with the application, in order to generate debug level logs for each of the applications in relationship, thereby obtaining detailed information for each application.

At block 608, software applications 204 (including agents) are configured to analyze the detailed information in the debug level logs for each of the applications according to the registered rules to determine the root cause of the problem causing the performance issue. By analyzing the debug level logs for each application, software applications 204 are configured to find more detailed problem information that uncovers the root cause of the problem and/or enable more debug level logs for any other related application in order collect more targeted data.

At block 610, software applications 204 are configured to check if the root cause of the problem causing the performance issue has been determined. For example, the (initial) application and/or an application determined to be in a relationship with the initial application can have rules in registered rules database 212 which direct software applications 204 how to search and examine (e.g., using statements) the respective debug level logs to find the root cause of the problem causing performance issue. If (NO) the root cause is not found, flow proceeds to block 616. If (YES) software applications 204 determine the root cause, software applications 204 are configured to check if a solution to the root cause of the problem is identified/provided/stored in the registered rules database 212 at block 612. For the application determined to be causing the root cause of the problem, software applications 204 are configured to check that application's rules in registered rules database 212 to find the solution. If (NO) solution is found, flow proceeds to block 616. If (YES) the solution is found in registered rules database 212, software applications 204 are configured to perform an action(s) associated with the solution to the root cause of the problem as instructed in the registered rules database 212, in order to thereby rectify the problem, at block 614. In some cases, software applications 204 can perform the action directly, and in some cases, software applications 204 can cause another piece of software and/or hardware to perform the action. For any solution (stored in registered rules database 212) provided for respective applications, software applications 204 are given access to any permissions, authentications, application program interfaces (APIs), scripts, etc., needed to execute the actions for the solution for the benefit of the application. One or more actions performed by and/or caused to be performed by the software applications 204 may include blocking access to certain parts of memory/storage to prevent a potential security threat, preventing one or more applications and/or nodes from being utilized to process certain types of transactions, etc.

At block 616, software applications 204 are configured to select data from each of the debug level logs for each the applications to generate a debug report, that can be quickly followed to determine the root cause of the problem. Software applications 204 analyze the debug level logs and determine the selected data based on rules in the registered rules database 212. At block 618, the software applications 204 are configured to alert the administrator and display the debug report, with one or more technical solutions for resolving the root cause of the problem, with one or more actions performed and/or being executed to resolve (fix) the root cause of the problem.

For explanation purposes and not limitation, an example scenario is discussed. FIG. 2 illustrates that three nodes and nine applications (e.g., such as nodes 1, 2, 3 and applications 1-9) have registered for enhanced diagnosis services with software applications 204. Performance monitors 208 inform software applications 204 of EPDS 220 that there is a performance issue on node 1, as depicted in FIG. 8. In the example scenario, node 1 is found by performance monitors 208 and/or agent 1 to have the performance issue that lasts for 3 minutes. In FIG. 8, software applications 204 are triggered to gather and analyze normal logs for node 1 and applications 1, 2, 5 running on node 1, because they are registered applications on node 1 and are related to the problem. Software applications 204 may use agent 1 to gather the normal logs for each of node 1 and applications 1, 2, 5. The normal logs are generated in their standard manner. A normal log may also be referred to as a log file, a common log, application log, application log file, etc. A normal log, common log, or application log is a file of events that are logged by a software application and it contains high-level information as understood by one having ordinary skill in the art. It contains errors, informational events, and warnings. The format and content of the normal log are determined by the developer of the software program.

As noted herein, all entities (e.g., applications 1-9) need to provide access to their log files. In order to utilize the analysis capacity of EPDS 220, each of the applications provide what statement(s) in logs needs to be noticed (e.g., parsed, searched for, matched, and/or examined) and subsequently analyzed by software applications 204. Each of the applications provides its own threshold of analysis results, and if any result from analysis exceeds the threshold, what action needs to be taken by software applications 204.

By analyzing the normal logs for each respective application, software applications 204 determine that application 1 has the performance issue. Application 1 can be determined as having the performance issue in a number of ways, such as by exceeding a threshold related to timing stored in registered rules database 212. Also, the normal log may contain a previously stored keyword related to an error in registered rules database 212. In FIG. 8, software applications 204 determine that four applications designated as grouping 230 have a working relationship, such as a collaboration, communication, dependency, etc. Particularly, software applications 204 determine that applications 2, 3, 4 have a working relationship with application 1. As a result of the working relationship with application 1, software applications 204 (which may use agent 1) are configured to initiate and enable debug programs for each of applications 1, 2, 3, 4 in order to generate debug level logs for each, thereby being able to gather detailed information for each of applications 1, 2, 3, 4, as depicted in FIG. 9. As seen in FIG. 9, debug programs are initiated/started for each of applications 1, 2, 3, 4, based on their specific rules provided/registered in advance and stored in registered rules database 212 in order to generate their respective debug level logs. Software applications 204 are configured to analyze the debug level log for each respective application 1, 2, 3, 4 to determine the root cause of the problem using registered data (e.g., statements) and the corresponding solution in registered rules database 212. Taking application 1 as an example, Table 2 identifies statements as a structure or format to be noticed/identified/examined by software applications 204. In this example scenario, software applications 204 are configured to identify that one or more statements in Table 2 of registered rules database 212 correspond to detailed data in the debug level log of application 1, and based on the value (e.g., timestamp difference) of the corresponding statements in detailed data of the debug level log exceeding a predetermined threshold set in Table 2 of registered rules database 212, software applications 204 are configured to start, initiate, perform, and/or cause the associated final action (e.g., stored in advance) in registered rules database 212 as the solution.

In determining that the problem occurred in application 1 by analyzing the normal log of application 1, software applications 204 can check the network, CPU, and memory data of associated with application 1 of node 1 according to the rules and find that there is no problem regarding the general information of the normal log. In determining that the problem occurred in application 1, software applications 204 can further check the debug level log (which may be an access log) or collect and check the snapshot, in order to find that the corresponding thread of application 1 changes slowly and/or does not change, thereby exceeding the threshold in registered rules database 212. As such, software applications 204 have determined and located that application 1 triggered the performance issue.

Debug level logs also referred to as debug logs are different from normal or common logs and provide in depth information. A debug level is a set of log levels for debug log categories, such as database, workflow, and validation. A trace flag includes a debug level, a start time, an end time, and a log type. The log types can include developer_log, user_debut, and class_tracing.

Continuing the example scenario, software applications 204 are configured to parse the detailed data of debug level logs for applications 1, 2, 3, 4 to find the information specified in the registered rules database 212, and software applications 204 are configured to generate a performance debug report using this information, as depicted in FIG. 10. FIG. 10 is a block diagram illustrating that software applications 204 (only) select out the registered data from each application's original debug level log in order to generate the debug report.

FIG. 11 is a block diagram further illustrating details performed by software applications 204 of EPDS 220 according to one or more embodiments of the invention. Software applications 204 are configured to analyze the performance debug report and find more nodes/applications that may be related to the problem in order to enable the debug level log for those newly found nodes/applications. As illustrated for application 1 in FIG. 11 but analogously applying to applications 2, 3, 4, software applications 204 are configured to retrieve/obtain the application 1 debug report, analyze the common data (basic information) and registered data, and determine if application 1 (in fact) has the performance issue or if another application on another node has the performance issue. In this example scenario, the application analysis by software applications 204 has identified that the request node 3 with application 7 has a time greater than the threshold. Accordingly, software applications 204 are configured to initiate/start the debug program to generate the debug level log for application 7 on node 3, given that application 7 has registered how to enable its debug level log in registered rules database 212, as depicted in FIG. 11. Accordingly, the enhanced performance diagnosis continues as discussed herein until the root cause of the problem is resolved which may be application 7, according to one or more embodiments.

There are many technical benefits and technical solutions provided according to one or more embodiments. In a cloud environment where there are many systems and layers involved, a system administrator cannot know everything. One or more embodiments avoid the need to require every layer's maintenance personnel attempt to gather data for different layers at the same time when the performance issue is occurring. Rather, the EPDS already automatically gathers basic performance data of for each layer (e.g., each node and application) along with all related components, and the EPDS analyzes them to find the component that is responsible for the performance issue in order to obtain detailed performance data for the component (using one or more debug level logs); this greatly saves time and saves effort from maintenance teams, thereby improving the cloud system's maintenance ability and quality by making it more efficient and timely.

As further technical benefits and solutions, for a short delay issue which is difficult to gather data, the EPDS system makes it easy to enable debug level logs to obtain needed data to resolve the performance issue. With any system's performance issue, the customer/client does not need to wait until the problem is reproduced especially when the problem may be very difficult to reproduce and/or take hours, days, or weeks to reproduce. Instead, the problem does not need to be reproduced in order to obtain the necessary data to resolve the root cause of the problem according to one or more embodiments. Further, the applications being monitored do not need any code change to utilize this EPDS. If an application is upgraded and the log information is changed, the applications only needs to modify the registered information and register again.

Figure 12:
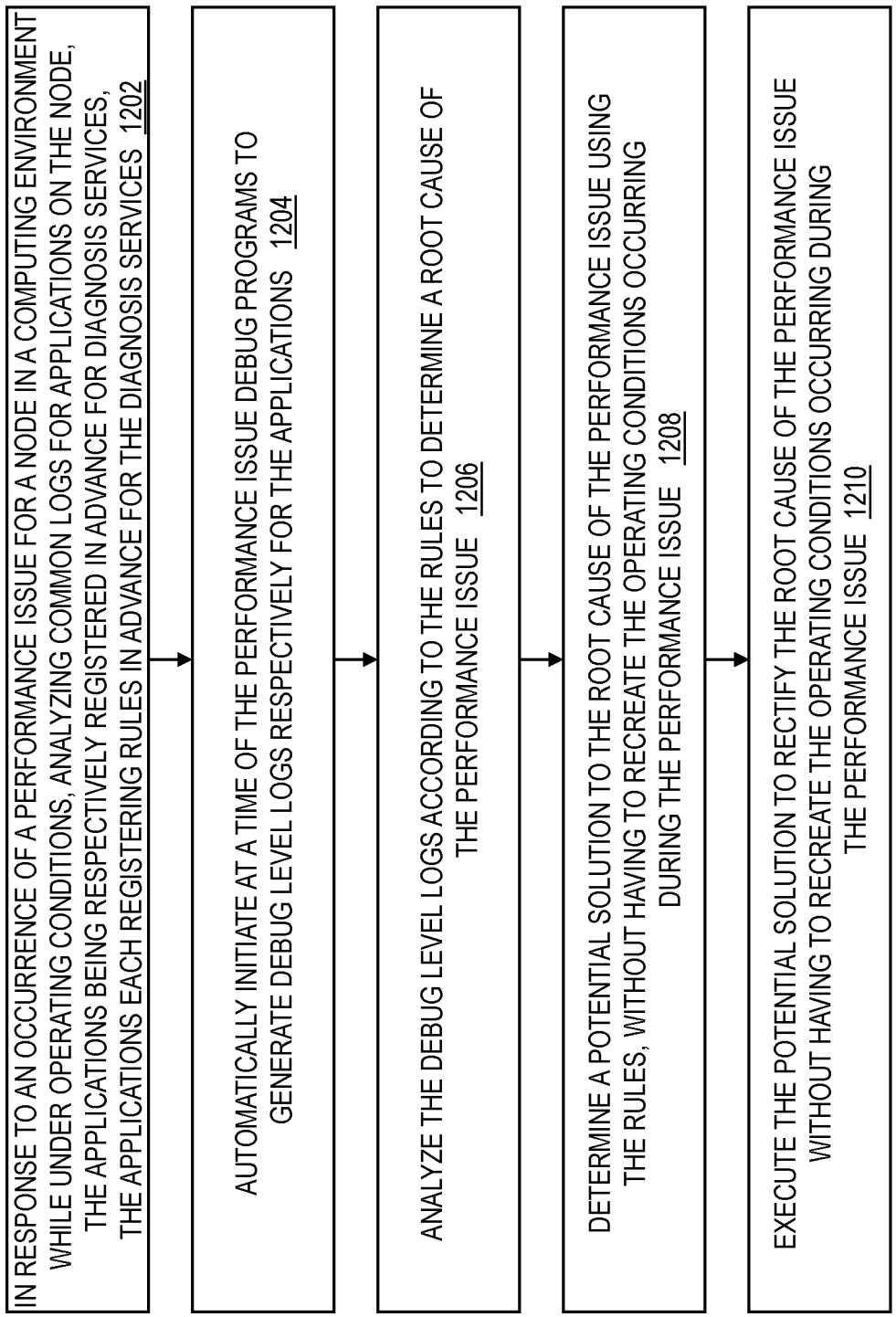
FIG. 12 is flowchart of a computer-implemented method for enhanced performance diagnosis and resolution of a performance issue in a network computing environment in accordance with one or more embodiments of the present invention.

FIG. 12 is flowchart of a computer-implemented method 1200 for providing enhanced performance diagnosis and resolution of a performance issue in a network computing environment, such as, for example, a cloud environment in accordance with one or more embodiments of the present invention. Computer-implemented method 1200 may be performed using computer system 200 in FIG. 2. Also, computer-implemented method 1200 may be performed using node 10 depicted in FIG. 13. Computer-implemented method 1200 can be used and/or implemented in hardware components of hardware and software layer 60 depicted in FIG. 14. Computer-implemented method 1200 will be discussed with reference, where appropriate, to FIGS. 1-11, 13, and 14.

At block 1202 of computer-implemented method 1200, in response to an occurrence of a performance issue for a node in a computing environment while under operating conditions, software applications 204 (e.g., with or without assistance for agents 1, 2, 3) are configured to analyze common logs (or normal logs) for applications on the node (e.g., applications 1, 2, 3 on node 1), the applications being respectively registered in advance for diagnosis services (e.g., in registered entities database 210), the applications each registering rules in advance for the diagnosis services (e.g., in registered rules database 212).

At block 1204, software applications 204 (e.g., with or without assistance for agents 1, 2, 3) are configured to automatically initiate/start at a time of the occurrent of the performance issue debug programs to generate debug level logs respectively for the applications.

At block 1206, software applications 204 (e.g., with or without assistance for agents 1, 2, 3) are configured to analyze the debug level logs according to the rules (e.g., stored in advance in registered rules database 212) to determine a root cause of the performance issue. Example registered data used as rules may be stored in Tables 1 and 2 of FIGS. 4 and 5 respectively.

At block 1208, software applications 204 (e.g., with or without assistance for agents 1, 2, 3) are configured to determine a potential solution to the root cause of the performance issue using the rules (e.g., stored in advance in registered rules database 212), without having to recreate the operating conditions occurring during the performance issue.

At block 1210, software applications 204 (e.g., with or without assistance for agents 1, 2, 3) are configured to execute the potential solution to rectify the root cause of the performance issue without having to recreate the operating conditions occurring during the performance issue. Example registered data used as rules for the solution and methods to execution the solution may be stored in Tables 1 and 2 of FIGS. 4 and 5 respectively.

Authorization to generate the debug level logs respectively for the applications is stored in advance of the performance issue (e.g., stored in advance in registered rules database 212). An action to execute the potential solution to the root cause of the performance issue is stored in advance of the performance issue (e.g., stored in advance in registered rules database 212). The common logs for the applications are searched to find information corresponding to the rules respectively for each of the applications, for example, as depicted in FIG. 8. The debug level logs for the applications are searched using the rules to find information corresponding to the rules respectively for each of the applications, for example, as depicted in FIG. 9.

Software applications 204 are configured determine that at least one of the applications is in a relationship with at least one other application based on searching the debug level logs for the applications using the rules. For example, applications 2, 3, 4 are in relationship with application 1, as depicted in FIG. 9. Also, software applications 204 may further determine that application 7 is in relationship with application 1, as depicted in FIG. 11. Software applications 204 are configured to perform the following: in response to determining that the at least one of the applications (e.g., applications 2, 3, 4 and/or application 7) is in the relationship with the at least one other application, automatically initiate a debug program to generate a debug level log for the at least one other application; analyze the debug level log according to other rules (e.g., rules for application 7) for the at least one other application in order to determine the root cause of the performance issue; determine another potential solution to the root cause of the performance issue using the other rules, without having to recreate the operating conditions occurring during the performance issue; and execute the another potential solution to rectify the root cause of the performance issue without having to recreate the operating conditions occurring during the performance issue.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
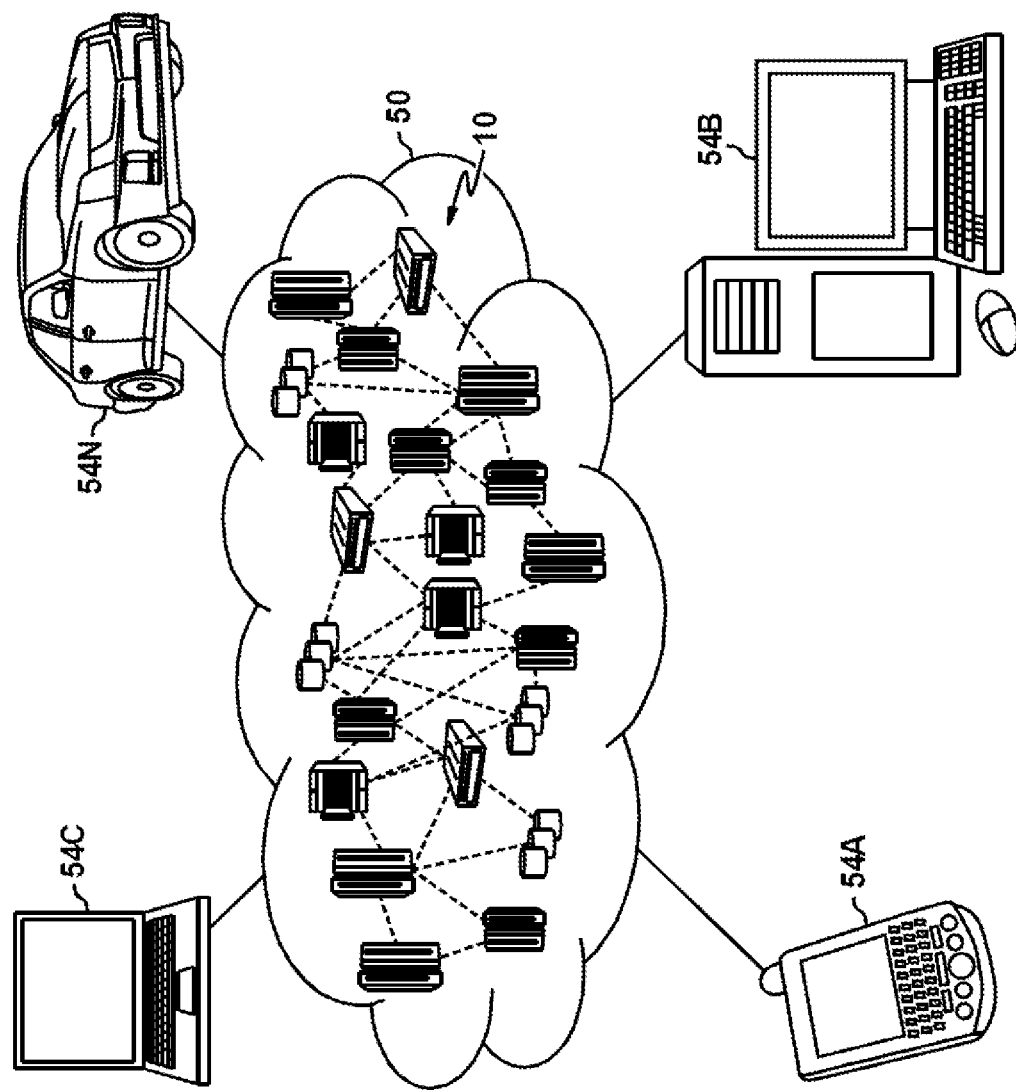
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
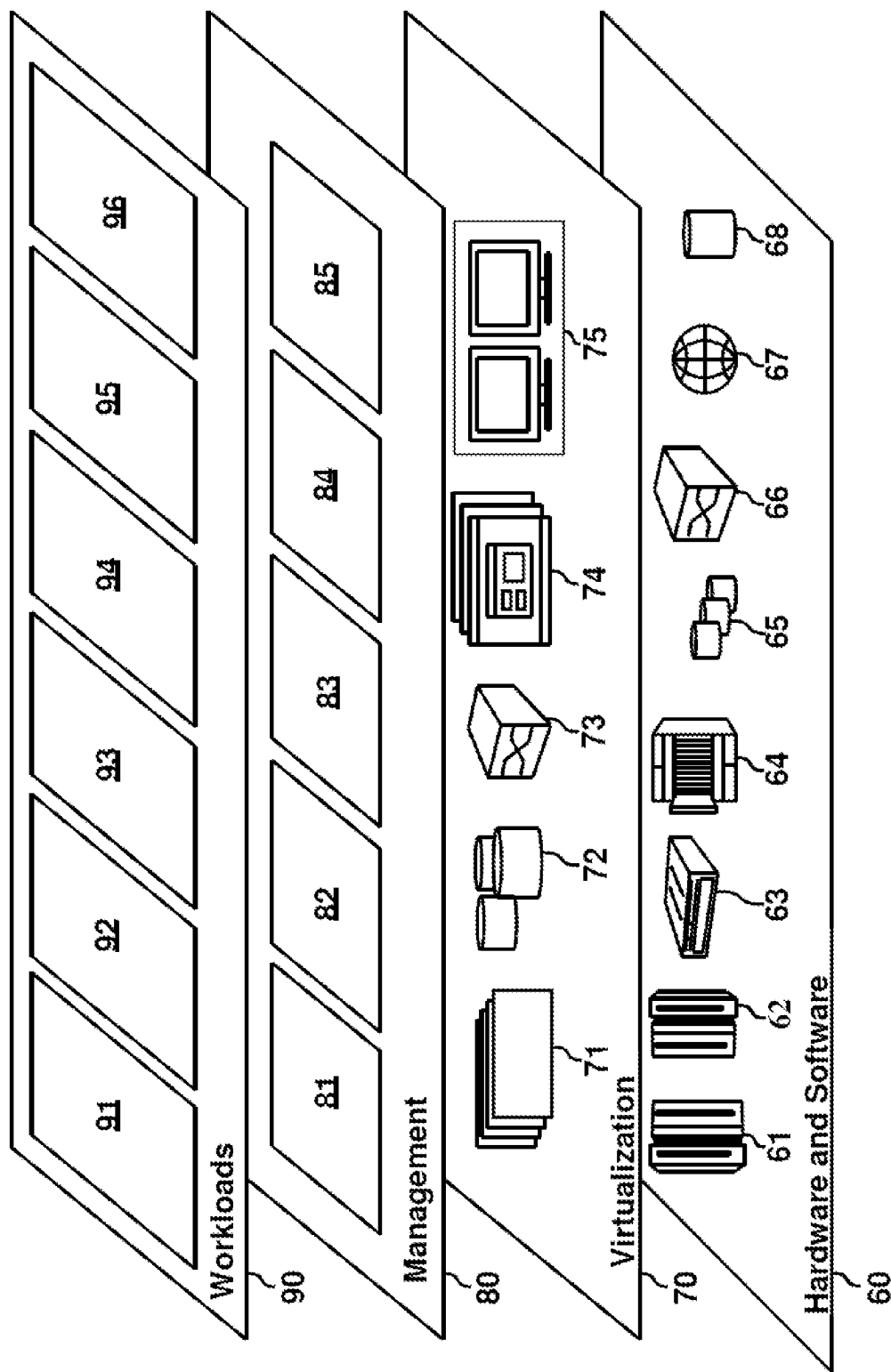
FIG. 14 depicts abstraction model layers according to one or more embodiments of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. In one or more embodiments, workloads and functions 96 may include software applications 204, agents 206 (including agents 1, 2, 3), etc.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    in response to an occurrence of a performance issue for a node in a computing environment while under operating conditions, analyzing common logs for applications on the node, the applications being respectively registered for diagnosis services in advance of the performance issue, the applications each registering rules for the diagnosis services in advance of the performance issue;

automatically initiating debug programs to generate debug level logs respectively for the applications at a time of the performance issue;

analyzing the debug level logs according to the rules to determine a root cause of the performance issue;

determining a potential solution to the root cause of the performance issue using the rules, the determining without recreating the operating conditions occurring during the performance issue; and executing the potential solution to rectify the root cause of the performance issue.

2. The computer-implemented method of claim 1, wherein authorization to generate the debug level logs respectively for the applications is stored in advance of the performance issue.

3. The computer-implemented method of claim 1, wherein an action to execute the potential solution to rectify the root cause of the performance issue is stored in advance of the performance issue.

4. The computer-implemented method of claim 1, wherein the common logs for the applications are searched to find information corresponding to the rules respectively for each of the applications.

5. The computer-implemented method of claim 1, wherein the debug level logs for the applications are searched using the rules to find information corresponding to the rules respectively for each of the applications.

6. The computer-implemented method of claim 1 further comprising determining that at least one of the applications is related to at least one other application based on searching the debug level logs for the applications using the rules.

7. The computer-implemented method of claim 6 further comprising:

in response to determining that the at least one of the applications is related to the at least one other application, automatically initiating a debug program to generate a debug level log for the at least one other application;

analyzing the debug level log according to other rules for the at least one other application in order to determine the root cause of the performance issue;

determining another potential solution to the root cause of the performance issue using the other rules, the determining without recreating the operating conditions occurring during the performance issue; and executing the another potential solution to rectify the root cause of the performance issue.

8. A system comprising:

a memory having computer readable instructions; and one or more processors for executing the computer readable instructions, the computer readable instructions controlling the one or more processors to perform operations comprising:

in response to an occurrence of a performance issue for a node in a computing environment while under operating conditions, analyzing common logs for applications on the node, the applications being respectively registered for diagnosis services in advance of the performance issue, the applications each registering rules for the diagnosis services in advance of the performance issue;

automatically initiating debug programs to generate debug level logs respectively for the applications at a time of the performance issue;

analyzing the debug level logs according to the rules to determine a root cause of the performance issue;

determining a potential solution to the root cause of the performance issue using the rules, the determining without recreating the operating conditions occurring during the performance issue; and executing the potential solution to rectify the root cause of the performance issue.

9. The system of claim 8, wherein authorization to generate the debug level logs respectively for the applications is stored in advance of the performance issue.

10. The system of claim 8, wherein an action to execute the potential solution to rectify the root cause of the performance issue is stored in advance of the performance issue.

11. The system of claim 8, wherein the common logs for the applications are searched to find information corresponding to the rules respectively for each of the applications.

12. The system of claim 8, wherein the debug level logs for the applications are searched using the rules to find information corresponding to the rules respectively for each of the applications.

13. The system of claim 8, wherein the operations further comprise determining that at least one of the applications is related to at least one other application based on searching the debug level logs for the applications using the rules.

14. The system of claim 13, wherein the operations further comprise:

in response to determining that the at least one of the applications is related to the at least one other application, automatically initiating a debug program to generate a debug level log for the at least one other application;

analyzing the debug level log according to other rules for the at least one other application in order to determine the root cause of the performance issue;

determining another potential solution to the root cause of the performance issue using the other rules, the determining without recreating the operating conditions occurring during the performance issue; and executing the another potential solution to rectify the root cause of the performance issue.

15. A computer program product comprising a computer readable storage medium having program instructions embodied therewith, the program instructions executable by one or more processors to cause the one or more processors to perform operations comprising:

in response to an occurrence of a performance issue for a node in a computing environment while under operating conditions, analyzing common logs for applications on the node, the applications being respectively registered for diagnosis services in advance of the performance issue, the applications each registering rules for the diagnosis services in advance of the performance issue;

automatically debug programs to generate debug level logs respectively for the applications at a time of the performance issue;

analyzing the debug level logs according to the rules to determine a root cause of the performance issue;

determining a potential solution to the root cause of the performance issue using the rules, the determining without recreating the operating conditions occurring during the performance issue; and executing the potential solution to rectify the root cause of the performance issue.

16. The computer program product of claim 15, wherein authorization to generate the debug level logs respectively for the applications is stored in advance of the performance issue.

17. The computer program product of claim 15, wherein an action to execute the potential solution to rectify the root cause of the performance issue is stored in advance of the performance issue.

18. The computer program product of claim 15, wherein the common logs for the applications are searched to find information corresponding to the rules respectively for each of the applications.

19. The computer program product of claim 15, wherein the debug level logs for the applications are searched using the rules to find information corresponding to the rules respectively for each of the applications.

20. The computer program product of claim 15, wherein the operations further comprise:
   determining that at least one of the applications is related to at least one other application based on searching the debug level logs for the applications using the rules;
   in response to determining that the at least one of the applications is related to the at least one other application, automatically initiating a debug program to generate a debug level log for the at least one other application;
   analyzing the debug level log according to other rules for the at least one other application in order to determine the root cause of the performance issue;
   determining another potential solution to the root cause of the performance issue using the other rules, without recreating the operating conditions occurring during the performance issue; and
   executing the another potential solution to rectify the root cause of the performance issue.

\* \* \* \* \*